No. 746,454. PATENTED DEC. 8, 1903.
A. B. CALLIN.
SCALE OR WEIGHING BEAM.
APPLICATION FILED JULY 27, 1903.
NO MODEL.
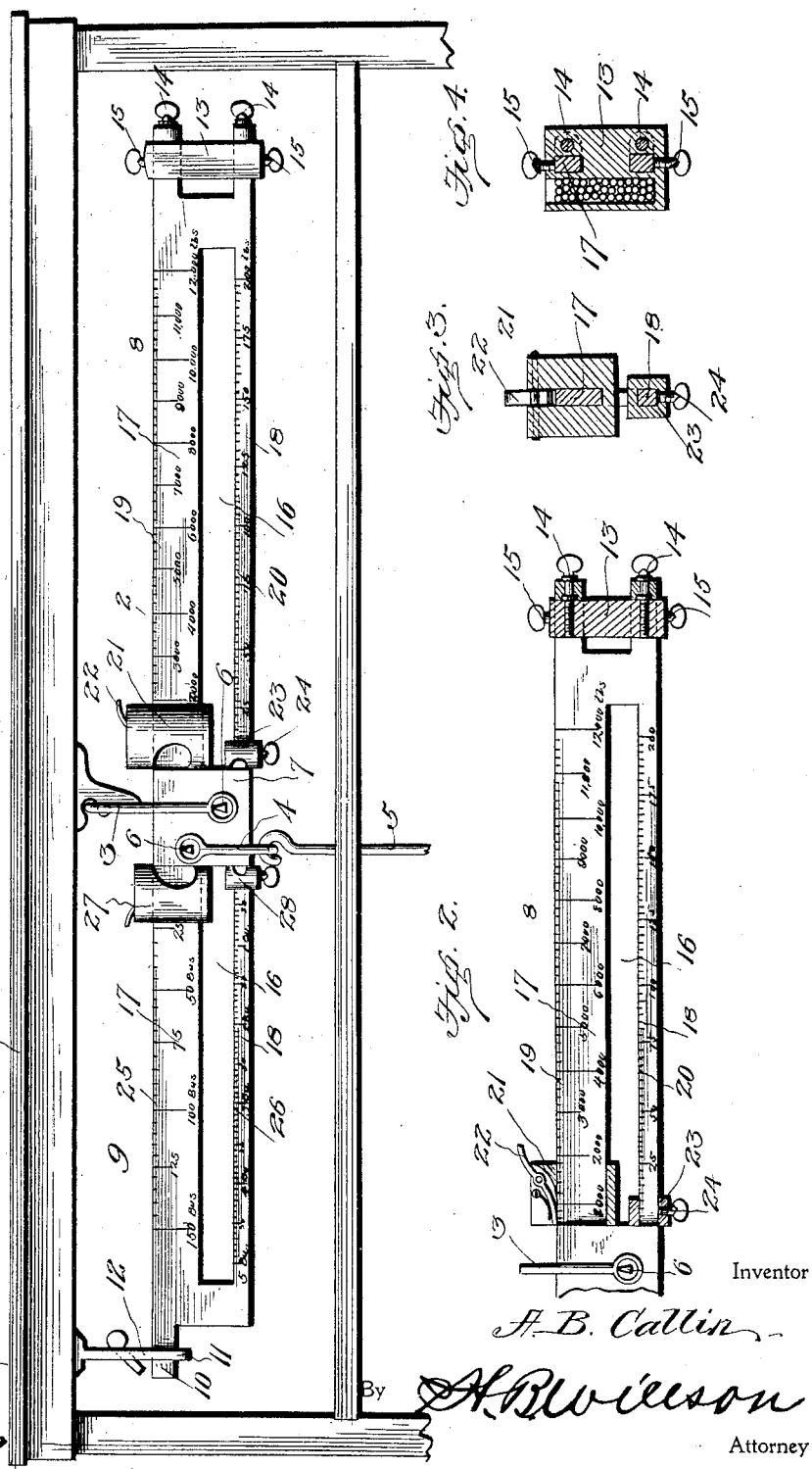
Witnesses
Inventor
A. B. Callin
By H. B. Wilson
Attorney No. 746,454. Patented December 8, 1903.

UNITED STATES PATENT OFFICE.

ALEXANDER B. CALLIN, OF RUSSELL, CANADA.

SCALE OR WEIGHING BEAM.

SPECIFICATION forming part of Letters Patent No. 746,454, dated December 8, 1903.

Application filed July 27, 1903. Serial No. 167,182. (No model.)

*To all whom it may concern:*

Be it known that I, ALEXANDER B. CALLIN, a subject of the King of Great Britain, residing at Russell, in the Province of Manitoba and Dominion of Canada, have invented certain new and useful Improvements in Scale or Weighing Beams; and I do declare the following to be a full, clear, and exact description of the invention, such as will enable others skilled in the art to which it appertains to make and use the same.

My invention relates generally to beams for weighing-scales, and more particularly to a computing-beam for dump-scales used in grain-elevators, warehouses, and the like for weighing grain.

The object of the invention is to provide a scale or weighing beam which is simple and inexpensive in construction, durable in use, efficient and accurate in operation, and which will indicate in bushels or by determined units of measure the net weight of material being weighed, thus dispensing with the necessity of making calculations to obtain the desired information.

With these and other objects in view the invention consists in certain novel features of construction, combination, and arrangement of parts, which will be hereinafter fully set forth, and particularly defined in the appended claim.

In the accompanying drawings, Figure 1 is a front elevation of my improved weighing-beam, showing the same mounted in the frame or housing of an ordinary wagon or dump scale. Fig. 2 is a detail vertical longitudinal sectional view through a portion of said beam, and Figs. 3 and 4 are vertical transverse sectional views through the same.

Referring to the drawings by numeral, 1 denotes a casing or housing in which a scale-beam 2 is pivotally mounted by means of a clevis 3 or other suitable suspending device and is similarly connected by a clevis 4 or other suitable device to a rod 5, which communicates the motion of the platform or weighing-surface of the scales to the beam 2. The pivot-points 6 of the suspending and balancing clevises 3 and 4 are formed upon a plate or solid portion 7, located adjacent to the center of said beam, so as to divide the same into right and left arms or members 8 and 9. The left arm 9 of the beams is formed with a reduced end 10, which moves in the usual fork or yoke 11, provided with the usual pivoted latch 12 for locking said beam against movement when the scales are not in use. The right arm 8 of the beam is provided with an adjustable counterbalance-weight 13 in the form of a hollow casing, adapted to contain shot or other heavy material. Said weight is adapted to be set or adjusted by end screws 14 and to be secured in its adjusted position by set-screws 15. Each of said arms of the beam is formed with a longitudinal slot 16, which divides the same into upper and lower scale-bars 17 and 18, upon which sliding poises or scale-weights are mounted. Upon the right arm 8 of the beam the unit of weight of the two scales 19 and 20 is pounds, the scale 19 upon the upper bar 17 being graduated in two-hundred-pound notches or marks from "0" to "12,000" pounds or higher, as desired, and the scale 20 upon the lower bar 18 being graduated in five-pound notches or marks from "0" to "200" pounds. Mounted upon the upper bar 17 of the right arm is a sliding poise or scale-weight 21, which is provided with a spring-actuated hand-lever 22 for locking said poise at any desired point on the beam, and mounted to slide upon the lower bar 18 of the same arm of the beam is a poise or scale-weight 23, which is provided with a set-screw 24 for fastening the same upon the beam. Upon the left arm 9 of the beam the unit of measure of the scales 25 and 26 is bushels, the scale 25 upon the upper bar being graduated in five-bushel notches or marks from "0" to "150" bushels or higher, and the scale 26 upon the lower bar is graduated in one-bushel notches, each of the latter being subdivided into five-pound or less marks or notches, as shown in Fig. 1 of the drawings. Poises or scale-weights 27 and 28, which are similar to the poises 21 and 23, are mounted to slide upon the upper and lower bars of left arm 9 of the beam.

The operation of my invention is as follows: When it is desired to weigh a load of grain, such as wheat, the wagon or other container in which the grain is held is placed upon the platform of the scales and the poises 21 and 23 are moved out upon the right arm 8 of the beam until the same is balanced and then fastened in position, as will be readily understood. The readings of these poises will be in pounds for the gross or total weight of the load, including both the grain and its container, and in order to obtain the net weight of the grain in bushels and pounds the load of grain is dumped, which will of course destroy the balance of the beam, and the poises upon the left arm 9 of the beam are then moved out until the beam is again balanced. The readings of the poises 27 and 28 will then indicate the exact quantity of grain in bushels and pounds that was upon the weighing-surface without the necessity of making calculations or referring to charts to obtain the desired information.

While I have shown the scale-graduations upon the left arm of the beam especially adapted for weighing wheat, it will be understood that the graduations may be of any desired character to adapt the beam for weighing other kinds of grains and various other articles.

From the foregoing description, taken in connection with the accompanying drawings, the construction, operation, and advantages of my invention will be readily understood without further explanation.

Various changes in the form, proportion, and the minor details of construction may be resorted to without departing from the principle or sacrificing any of the advantages of my invention.

Having thus described my invention, what I claim, and desire to secure by Letters Patent, is—

A scale-beam having its pivot at a point intermediate its ends to provide oppositely-extending arms of unequal length, each having a pair of scale-bars, the scale-bars of the larger arms having gross-weight scales and provided respectively with sliding weights of different weight, and the scale-bars of the shorter arms having net-weight scales and provided respectively with sliding weights of different weight, substantially as described.

In testimony whereof I have hereunto set my hand in presence of the subscribing witnesses.

ALEXANDER B. CALLIN.

Witnesses:
A. F. CLOW,
ERNEST N. WILLIAMS,
ARCHD. R. TINGLEY.